United States Patent Office 3,408,728
Patented Nov. 5, 1968

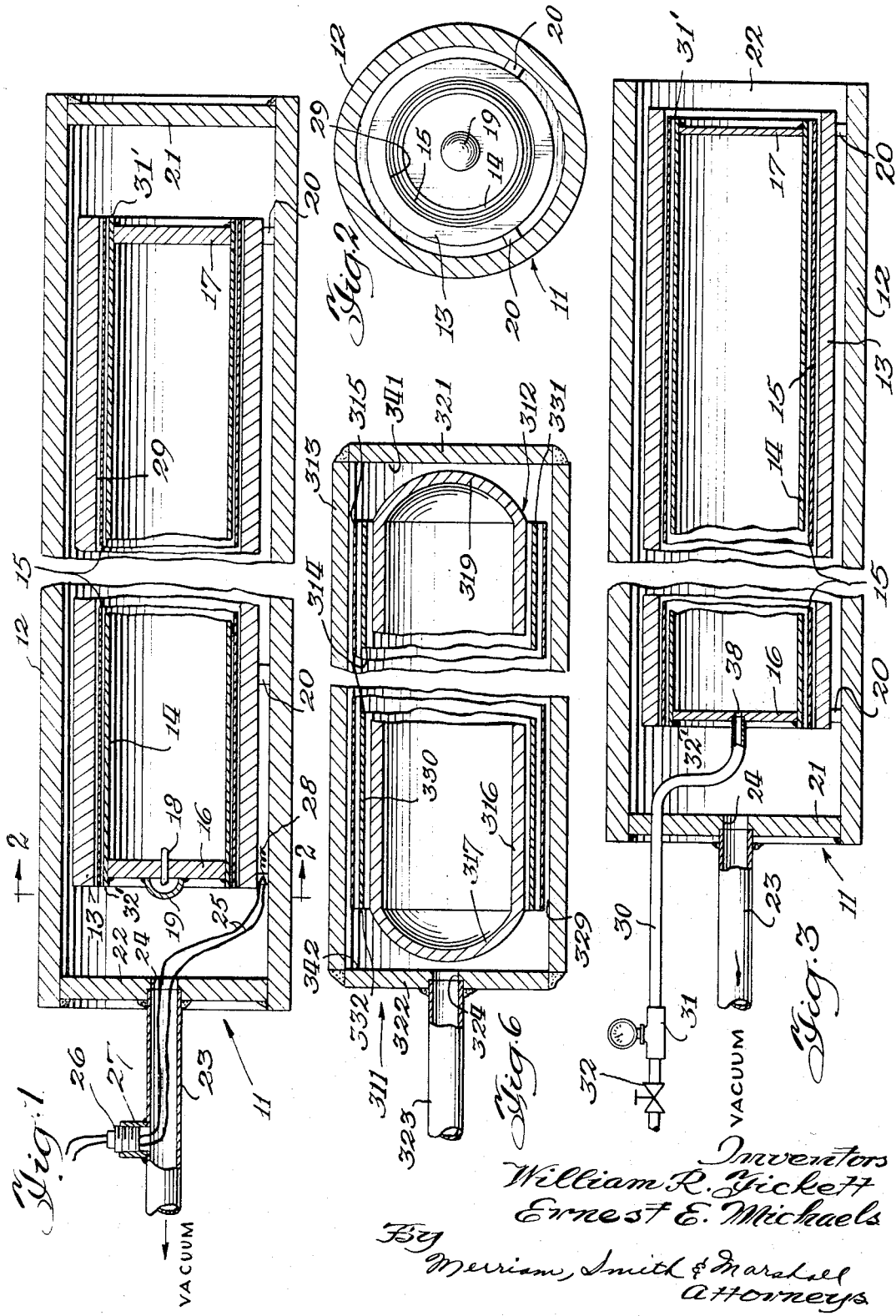

3,408,728
THERMAL CLADDING METHOD
William R. Fickett, Birmingham, Ala., and Ernest E. Michaels, Chicago, Ill., assignors to Chicago Bridge & Iron Company, Oak Brook, Ill., a corporation of Illinois
Filed May 15, 1963, Ser. No. 280,570
4 Claims. (Cl. 29—474.5)

The present invention relates generally to thermal cladding apparatus and methods, and more particularly to apparatus and methods wherein a tubular shell member is clad with a tubular cladding member, either internally or externally, under conditions which allow unimpeded longitudinal thermal expansion of the inner member relative to the outer member.

In one type of thermal cladding operation to which the present invention relates generally, a tubular cladding member is assembled in telescoped relation with a tubular shell member, with brazing material located between the exterior of the inner member and the interior of the outer member; the resulting assembly is subjected to heating; and pressure is imparted internally with respect to the inner member to urge the inner member radially outwardly toward the interior of the outer member. In another type of operation the outside surface of the backing member is clad, rather than the inside.

The cladding operation is carried out at elevated temperatures at which the brazing material is operative. Accordingly, both the cladding member and the shell member undergo thermal expansion. The cladding member is composed of a material having different thermal expansion properties than the shell member. Therefore, the amount of longitudinal expansion which the cladding member will undergo during the cladding operation will differ from the amount of longitudinal expansion which the shell member will undergo. If anything obstructs or impedes the longitudinal thermal expansion of the inner member relative to the outer member, there will be a buckling of the cladding member relative to the backing member, and, in the resulting clad tubular product, there will be undesirable voids between the shell and the cladding.

The present invention provides apparatus and methods, to be subsequently described in detail, for thermally cladding a shell, either internally or externally, without obstructing longitudinal expansion of the cladding member relative to the backing member. Accordingly, the end result is a clad tubular product without undesirable voids between the shell and the cladding.

Other features and advantages are inherent in the structure claimed and disclosed or will become apparent to those skilled in the art from the following detailed description in conjunction with the accompanying drawings wherein:

FIGURE 1 is a sectional view of one embodiment of an assembly or apparatus constructed in accordance with the present invention and for practicing an embodiment of a method in accordance with the present invention;

FIGURE 2 is a sectional view taken along line 2—2 in FIGURE 1;

FIGURE 3 is a sectional view similar to FIGURE 1 and illustrating another embodiment of apparatus constructed in accordance with the present invention;

FIGURE 6 is a sectional view illustrating a further embodiment of the subject apparatus.

Figure 4:
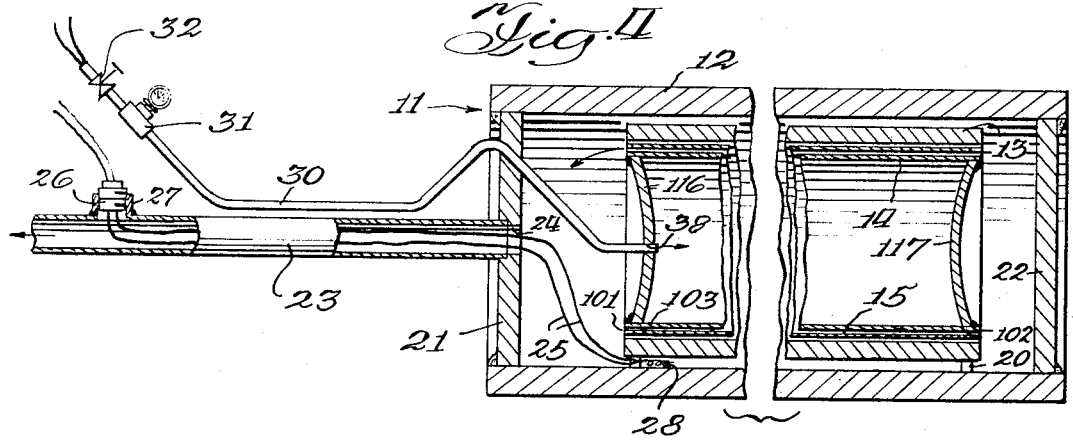
FIGURE 4 is a sectional view similar to FIGURE 1 illustrating still another embodiment of apparatus.

Referring initially to FIGURES 1 and 2 there is indicated an embodiment of apparatus, in the form of an assembly indicated generally at 11, constructed in accordance with the present invention and for performing a cladding method in accordance with the present invention.

Apparatus 11 includes an enclosed, heatable container 12 within which an outer tubular shell 13 is supported on conventional mounting means 20. Located within shell 13, in telescoped relation therewith, is a tubular inner cladding liner 14, and disposed between liner 14 and shell 13 is conventional brazing material 15 which may be in the form of powder, foil or the like, or may have been previously deposited on the exterior surface of liner 14 by electroplating or otherwise. Each of the opposite ends 31, 32 of inner liner 14 is hermetically sealed by closure means or walls 17, 16 respectively. Extending through closure means 16 is a tube 18 for introducing a pressure-imparting fluid (which may be air or an inert gas, such as argon) into the interior of tubular cladding liner 14 prior to heating. A cap 19 extends around the exterior open end of conduit 18 and forms part of the hermetic seal of the interior of liner 14.

Heatable container 12 is tubular and at opposite ends thereof are walls or sealing means 21, 22 respectively. Sealing means 22 includes an opening 24 in communication with a conduit 23 for evacuating the interior of heatable container 12. The leads 25 of a thermocouple 28 extend through conduit 23, through a cap 26 on a conduit appendage 27 communicating with conduit 23, and terminate at a temperature measuring instrument (not shown).

In operation the entire assembly 11 is placed within a furnace, or subjected to heating in any conventional manner, and the interior of heatable container 12 including annular space 15, is evacuated through conduit 23. Because inner cladding liner 14 is hermetically sealed, the pressure of the fluid within liner 14 increases as the assembly is subjected to heating. This, together with the differential in pressure between the interior and the exterior of liner 14 (resulting from the evacuation of the interior of heatable container 12), produces an internal pressure with respect to tubular liner 14 causing the liner to be urged radially outwardly, evenly along substantially the entire peripheral area of liner 14, toward the interior surface 29 of outer shell 13. Concurrently, the brazing material 15 located between the exterior of liner 14 and the interior of shell 13 becomes operative at the elevated temperatures to which the entire assembly is subjected, and cladding of liner 14 to the interior of shell 13 is effected. Because annular space 15 is evacuated, brazing may be performed without a flux or a controlled atmosphere.

As will be noted from an examination of FIGURE 1, there is nothing in the illustrated assembly which will obstruct longitudinal expansion of liner 14 relative to external shell 13. There is no mechanical attachment of inner liner 14 to outer shell 13 along the entire length of the liner. Furthermore, the spacing between a liner end 31, 32 and the respective adjacent wall 21, 22 of container 12 is arranged to exceed the longitudinal expansion distance through which a liner end will move during the cladding operation. In other words, the assembly 11 is free of obstacles in the path of longitudinal expansion of at least one of the ends of inner liner 14 for the entire longitudinal expansion distance through which the inner liner moves during the cladding operation.

Accordingly, there will be no buckling, or other adverse side effects, of liner 14 relative to shell 13. The end result of the cladding operation will be a product constituting an external shell 13 to the interior of which is clad a liner 14, and without voids between external shell 13 and liner 14.

Referring now to FIGURE 3, there is illustrated another embodiment of apparatus differing from the embodiment illustrated in FIGURES 1 and 2 in that the apparatus of FIGURE 3 includes a conduit 30 communicating with an opening 38 in hermetic closure means 16 located at end 32 of liner 14. A pressure-measuring gauge 31 and a valve 32 are provided on conduit 30. Conduit 30 enables introduction of a fluid, such as argon or other inert gases, into the interior of sealed liner 14 during the cladding operation. Conduit 30 also enables reduction of the internal pressure within sealed liner 14 if said pressure were built up excessively by heat during the cladding operation. Utilizing an arrangement of the type illustrated in FIGURE 3 enables the relative internal pressures within liner 14 to be more closely adjusted and controlled as compared to the apparatus illustrated in FIGURE 1.

Referring now to FIGURE 4, the illustrated embodiment of apparatus is similar to that in FIGURE 3 except that the end walls or sealing means 116, 117 at respective opposite ends of internal cladding liner 14 are dished inwardly. This arrangement provides an assembly that is less likely to develop a leak during the cladding operation than that illustrated in FIGURES 1 or 3. During the cladding operation, as the interior of heatable container 12 is evacuated and/or as the pressure-exerting fluid is introduced into the interior of sealed liner 14, the differential in pressure between the interior and exterior of liner 14 causes dished closure means 116, 117 to tend to bow outwardly. As a result, the outer peripheral edges 101, 102 of closure means 116, 117 are urged into tighter, more leak-proof engagement with the interior surface 103 of liner 14.

Figure 5:
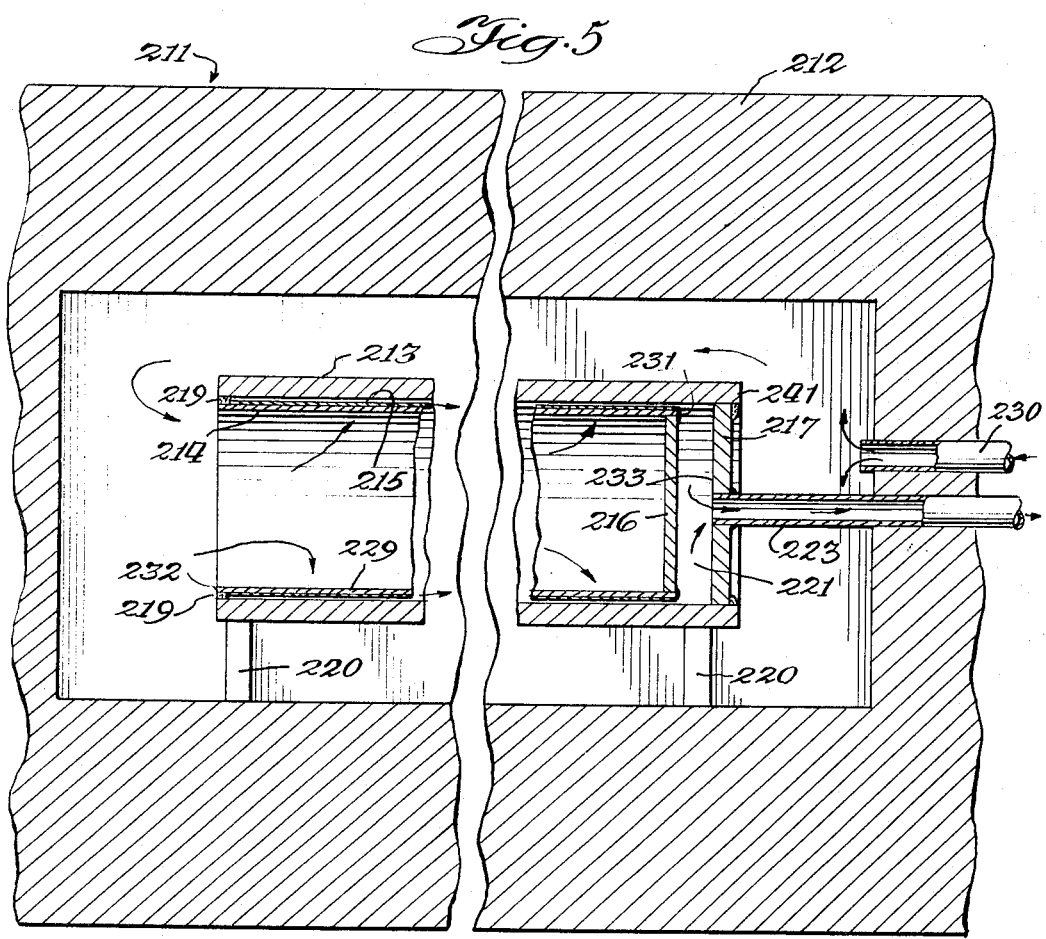
FIGURE 5 is a sectional view illustrating an additional embodiment of the subject apparatus.

Referring now to the apparatus of FIGURE 5, the embodiment 211 illustrated therein includes a heatable container 212 within which is located an external tubular shell 213 mounted on means 220. Telescoped coaxially within shell 213 is a tubular inner cladding liner 214 with brazing material 215 between liner 214 and shell 213. One end 231 of liner 214 is closed by a hermetic closure or sealing means 216, and one shell end 241, adjacent end 231 of liner 214, is closed by hermetic closure or sealing menas 217. At the other end 232 of liner 214, between the liner and shell 213, is a peripheral hermetic seal or mechanical attachment in the form of a peripheral weld 219 encircling liner end 232. Weld 219 constitutes the sole mechanical attachment between the outer shell and the inner liner.

Liner end 231 is spaced, in an axialy or longitudinally inward direction, from shell closure 217. Both liner 214 and shell 213 will undergo longitudinal thermal expansion during the thermal cladding operation. Because they have different thermal expansion properties, liner 214 and shell 213 will undergo different amounts of longitudinal thermal expansion with the amount of longitudinal thermal expansion undergone by the liner generally exceeding that undergone by the shell. Therefore, the longitudinal distance between liner end 231 and the adjacent surface 233 of shell closure 217 exceeds the longitudinal expansion differential between liner 214 and shell 213.

Liner 214, mechanical attachment 219, shell 213, and closures 216, 217 define a hermetically-enclosed space 221 communicating with a conduit 223 communicating with evacuating means (not shown). Communicating with the interior of container 212 is a conduit 230 for introducing a pressure-imparting fluid to the interior of sealed container 212.

In operation, space 221 is evacuated through conduit 223 and a pressure-imparting fluid such as an inert gas is introduced into the interior of container 212 through conduit 230. As space 221 is evacuated, inner cladding liner 214 is urged, by the fluid pressure-imparting means described above, radially outwardly toward the interior surface 229 of outer shell 213. The entire assembly is subjected to an elevated temperature, at which the cladding material 215 is operative, to effect the cladding of liner 214 to the interior of shell 213.

Because liner 214 is mechanically attached to shell 213 only at end 232 of the liner, by weldment 219, with no attachments between shell 213 and liner 214 from a location adjacent liner end 232, along the rest of the length of the liner to and including liner end 231; and because inner surface 233 of shell closure means 217 is spaced from liner end 231 a distance greater than the longitudinal expansion differential between liner 214 and shell 213; and because there are no obstructions between liner end 231 and shell closure 217, liner 214 will undergo longitudinal expansion without impedance or obstruction, and there will be no buckling of liner 214 relative to shell 213 during the cladding operation. As a result, the end product will have no voids between shell 213 and liner 214.

Referring now to FIGURE 6, the embodiment 311 indicated generally therein includes an outer tubular shell 313 having hermetic closures 321, 322 at opposite ends thereof to provide a hermetically sealed enclosure. Located within tubular shell 313 in radially spaced relation thereto is tubular inner cladding liner 314, and located in the annular space between liner 314 and shell 313 is brazing material 315 (e.g., in the form of a thin, foil-like material), said tubular shell, said internal liner 314 and said brazing material being in telescoped relation as shown in FIGURE 6.

The pressure-imparting means for apparatus 311 includes a hollow member 312 telescoped within liner 314 and consisting of a cylindrical portion 316 and opposed dome-like end portions 317, 319 all of which are attached together to form a hermetically sealed enclosure. Member 312 contains gas. Shell closure 322 includes an opening 324 in communication with a conduit 323 for evacuating the hermetically-sealed interior defined by shell 313 and closures 321, 322.

In operation, the interior of tubular shell 313 is evacuated through conduit 323 to a pressure substantially below that inside member 312, and the entire assembly is placed inside a furnace or otherwise subjected to an elevated temperature at which the brazing material 315 becomes operative. During heating of assembly 311, expansion of the gas within hollow pressure-imparting member 312 together with the differential in pressure between the interior and exterior of member 312 causes an expansion of member 312 radially outwardly against the interior surface 330 of liner 314 causing the liner to be urged radially outwardly toward the interior surface 329 of outer shell 313, to help effect the cladding of the liner to the interior of the shell.

It will be noted from an examination of FIGURE 6, that there is nothing to obstruct longitudinal thermal expansion of liner 314 relative to shell 313. The distance between a respective liner end 331, 332 and the respective adjacent inner surface 341, 342 of a shell closure 321, 322 is arranged to exceed the longitudinal expansion differential between an end of the liner and the adjacent end of the shell during the cladding operation.

The composition of the outer shell, the inner liner, and the brazing material depend upon the particular use to which the resulting product is to be put. The temperatures and pressures used in the cladding operation depend upon the composition and dimensions of the materials used. These compositions and process conditions are within the skill of the art, and the present invention is intended to be used for combinations of materials and conditions as utilized in the cladding art. For example see Brown U.S. Letters Patent No. 2,713,196.

The important consideration is that the apparatus and methods of the present invention provide a solution to the problem of buckling of a tubular liner relative to a tubular shell when the liner and the shell are composed of materials having different thermal expansion properties. As previously indicated, this is accomplished by providing an assembly or apparatus of the type described and which is free of obstacles in the path of longitudinal thermal expansion of at least one end of the liner for the entire longitudinal expansion distance which the liner moves during the cladding operation. In addition, the assembly is devoid of mechanical attachments between the outer shell and the inner liner from a location adjacent the liner's other end, opposite said one liner end, along the rest of the length of the liner to and including the aforementioned one end of the liner. Moreover, the inner liner is loosely telescoped within the outer shell to facilitate longitudinal expansion of the liner relative to the shell during heating of the assembly. Thus, at least a portion of the outer surface of the inner liner is radially spaced from the inner surface of the outer shell.

The foregoing detailed description has been given for clearness of understanding only, an no unnecessary limitations should be understood therefrom, as modifications will be obvious to those skilled in the art.

What is claimed is:

1. A method for thermally cladding a tubular liner having first and second ends to a tubular shell having different thermal expansion properties than said liner, said method comprising:

assembling said liner in telescoped relation within said shell with brazing material therebetween, and without mechanically attaching said liner to said shell from a location adjacent said first end of the liner along the rest of the length of said liner to and including the second end of the liner;

arranging at least a portion of the outer surface of said liner in radially spaced relation from the inner surface of the shell so that said liner is loosely telescoped within the shell to facilitate longitudinal expansion of the liner relative to the shell during heating of the assembly comprising the shell, the liner and the brazing material;

evacuating the space between said liner and said shell;

heating said assembled shell and liner to a predetermined temperature at which said brazing material is operative and at which both said shell and said liner undergo thermal expansion, without obstructing longitudinal thermal expansion of at least one of the ends of said liner for the entire longitudinal expansion distance through which said liner moves;

and adjusting the relative pressure internally with respect to the inner liner through the use of expandable gas to urge the inner liner radially outwardly, evenly along substantially the entire peripheral area of the inner liner, into contact with the inner surface of the outer shell while permitting longitudinal thermal expansion of the inner liner relative to the outer shell, said inner liner being urged into said contact with the inner surface of the outer shell no earlier than during said heating step.

2. A method as recited in claim 1 and comprising:
hermetically sealing said liner;
introducing said expandable gas into said hermetically sealed liner;
placing said assembled shell and liner inside a hermetically sealed heatable container before said heating;
and evacuating the interior of said container.

3. A method as recited in claim 2 and comprising:
introducing said expandable gas into said hermetically sealed liner after said assembled shell and liner is inserted into said heatable container.

4. A method as recited in claim 1 and comprising:
assembling said liner and said shell with said first end of the liner longitudinally spaced inwardly from an adjacent first end of said shell;
hermetically sealing the first end of said liner and the first end of said shell;
hermetically sealing the annular space between the liner and the shell at the second end of said liner;
and evacuating the space defined by the hermetic seal, said hermetic closures, said liner and said shell.

References Cited

UNITED STATES PATENTS

| 895,412 | 8/1908 | Badger | 29—474.4 X |
| 930,927 | 8/1909 | Berkstresser | 29—474.4 |
| 2,093,814 | 9/1937 | Mann. | |
| 2,713,196 | 7/1955 | Brown | 29—497.5 X |
| 2,820,286 | 1/1958 | Andrus | 29—497.5 X |
| 3,025,596 | 3/1962 | Ward. | |
| 3,156,042 | 11/1964 | Reed | 29—501 X |

FOREIGN PATENTS

| 1,077,124 | 11/1954 | France. |

JOHN F. CAMPBELL, *Primary Examiner.*

R. F. DROPKIN, *Assistant Examiner.*